April 7, 1925.

W. J. STEINLE

APPARATUS FOR VULCANIZING TIRES

Filed Oct. 25, 1923

1,532,274

Inventor
WILLIAM STEINLE
administrator of estate of
WILLIAM J. STEINLE, deceased.
By Ernest Hopkinson
Attorney

Patented Apr. 7, 1925.

1,532,274

UNITED STATES PATENT OFFICE.

WILLIAM J. STEINLE, DECEASED, LATE OF FLUSHING, NEW YORK, BY WILLIAM STEINLE, ADMINISTRATOR, OF FLUSHING, NEW YORK, ASSIGNOR TO THE HARTFORD RUBBER WORKS COMPANY, OF HARTFORD, CONNECTICUT, A CORPORATION OF CONNECTICUT.

APPARATUS FOR VULCANIZING TIRES.

Application filed October 25, 1923. Serial No. 670,649.

*To all whom it may concern:*

Be it known that I, WILLIAM STEINLE, a citizen of the United States, and a resident of Flushing, Long Island, county of Queens and State of New York, duly appointed administrator of the estate of WILLIAM J. STEINLE, deceased, late a citizen of the United States, and a resident of Flushing, Long Island, county of Queens, and State of New York, believe the said WILLIAM J. STEINLE, deceased, to be the inventor of a new and useful Apparatus for Vulcanizing Tires, of which the following is a full, clear, and exact description.

This invention relates to the manufacture of tires and more particularly mold equipment for curing them.

In one method of manufacture pneumatic tire casings, the constituent cords and rubber composition after being built into the form desired are mounted on a sealing ring and surrounded by mold sections which confine the green casings externally. Internally fluid under pressure, such, as an inert gas or air, is applied to the casings to exert a wall-compacting pressure on the constituents while they are vulcanized. Heretofore, in order to prevent leakage of the pressure fluid, a sealing strip of gum has been interposed between the beads and the sealing ring.

It has been discovered that the gas or pressure fluid dissolves in or permeates the rubber structure of the casings to an extent varying with the character of the gas used and its pressure and other features. As the pressure of the fluid within the casings during vulcanization is in the neighborhood of 200 pounds more or less and is much greater than the pressure of the space immediately surrounding the molds, it not infrequently happens that the casings leak or develop leaks during the vulcanizing operation, and this, notwithstanding the use of sealing gum between the beads and the sealing ring. Such leaks result in defective tires.

The present invention aims to improve upon the process heretofore in use for curing casings with fluid under pressure in direct contact with their interior by metallically sealing the mold parts or equipment below and immediately adjacent the bead portions of the casings.

An embodiment of the invention is illustrated in the accompanying drawings, in which:—

Figure 3:
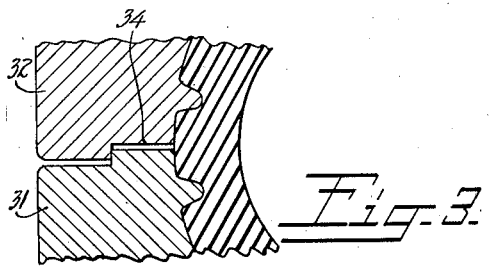

And Figure 3 illustrates still another structure for accomplishing the purpose of the present invention.

Figure 1:
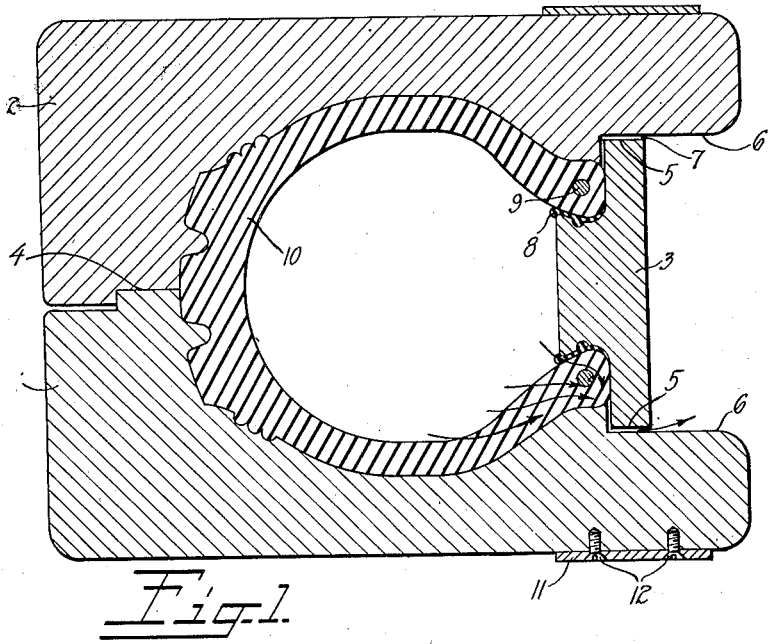
Figure 1 shows an old form of mold equipped to establish a metallic seal.

Referring to Figure 1 of the accompanying drawings, the mold sections are indicated at 1 and 2 and the sealing ring at 3. The prevailing practice is to part the molds at 4 so that along this meeting face or zone, the two halves are pressed together tightly. The margins 5 of the sealing ring 3 cannot be made to exactly fit the cutaway portions 6 of the mold sections, and hence, there is commonly a gap, 7, of at least a few thousandths of an inch between the mold sections and the sealing ring, and this gap 7 has been permitted because the sealing strip of gum 8 between the beads 9 of the casing 10 and the sealing ring 3 has been thought sufficient to seal and hold the internal pressure fluid. But owing to the high pressure of the internal fluid, it passes by solution or permeation into the rubber and fabric constituting the carcass 10, and moves down through the same as indicated by the unlettered arrows on Figure 1, to the gap 7. This movement or leakage of the gas is not considerable and has not occurred in the past to an extent prohibiting practice of the so-called gas vulcanizing process. But, nevertheless, the leakage occurs, in some cases, of course, more than in others, owing to the tolerance necessarily allowed machine workers in fashioning the molds and sealing ring.

Figure 2:
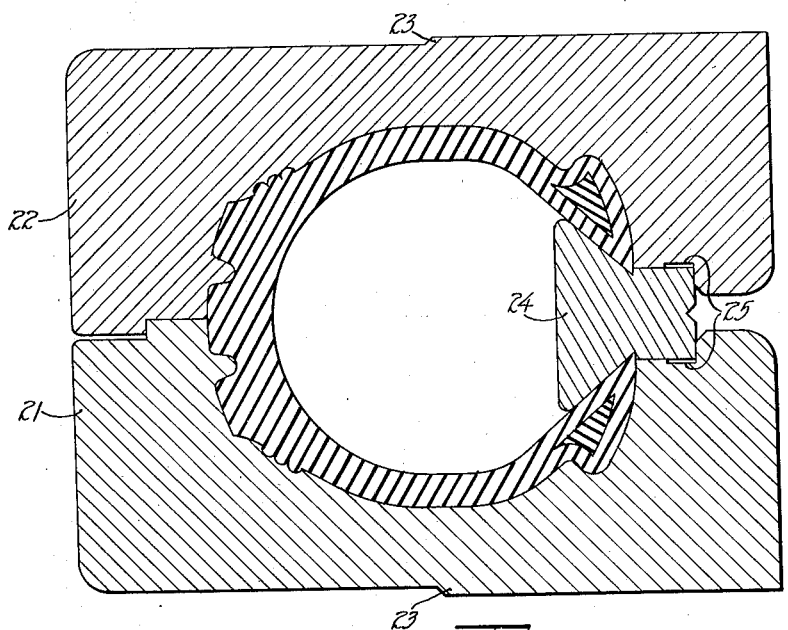
Figure 2 shows another structure for effecting a metallic seal.

According to the present invention, the leakage is obviated, generally stated, by locally increasing the thickness of the mold sections or sealing ring, or both, in the region of the bead-engaging portions thereof. This may be accomplished in various ways: By locating a ring 11, Figure 1, of suitable thickness opposite the bead portions 9 of the casing, which ring 11 may be either secured by screws 12 to the mold sections or may be merely laid loosely thereon, as indicated in Figure 1, or, as indicated in Figure 2, the mold sections 21 and 22 may each be provided with a slight circular boss or enlargement 23, which may be unbroken and continuous, as shown, or interrupted, i. e., constituted by a series of projections or raised portions. Less desirably, the mold sections 31 and 32 may be machined off at either meeting, as indicated at 34, Figure 3, so as not to come together and contact when the bead-engaging portions of the mold sections are in metallic contact with the center or sealing ring.

In Figure 2 of the drawings, the mold sections are channelled or grooved, as indicated at 25, to still further localize the pressure between the sealing ring 24 and the mold sections.

In all forms of the invention, it will be seen that the total thickness of each mold measured transversely to the plane of the parting face 4 and on a line passing directly through the same is less than the total thickness through the mold sections and the sealing ring in the region of the bead-engaging portions of the molds. Therefore, when, as is the practice, these molds are stacked up in a press and the ram pressure is applied, a metallic seal, approaching a ground joint, will be effected. The contacting faces of the mold sections and sealing ring are necessarily somewhat rough and do not come together perfectly throughout the extent of the faces in engagement so as to constitute a hermetic seal when the ram pressure is first applied. The minute or microscopic passages, however,—which result from the limitations of the machinists—become closed by the flow of rubber from the bead portions of the casing during the heat treatment, or, they may be filled by merely brushing the faces of the joints with cement.

From the drawings, it will be clear that this invention is applicable to clinchers as well as straight-side casings. The invention is not restricted to the manufacture of either type of casing, and it may be realized in various forms other than has been disclosed. Therefore, reference should be made to the appended claims for a clear understanding of the scope of the invention.

Having thus described the invention, what is claimed and desired to be protected by Letters Patent is:—

1. Tire vulcanizing mold equipment comprising substantially duplicate mold sections provided with cavities for shaping the outside of a casing, a sealing ring for closing the gap between the mold sections at the bead-engaging portions thereof, and means for locally thickening the outside dimensions of the molding equipment in the region of the bead-engaging portion thereof.

2. Tire vulcanizing mold equipment comprising substantially duplicate mold sections for shaping the outside of a casing, and a sealing ring for closing the gap between the mold sections at the bead-engaging portions thereof, the total thickness of the mold sections and sealing ring at the bead-engaging portions of the sections being greater than the total thickness of the mold sections at the tread-engaging portions thereof.

3. Tire vulcanizing apparatus comprising annular mold sections and a sealing ring for closing the gap therebetween at the bead-engaging portions, said mold sections having opposed inner faces grooved to impart a predetermined external configuration to the tires and stepped outer faces which adjacent their inner peripheries are higher than adjacent their outer peripheries.

Signed at New York city, county of New York, and State of New York, this 22nd day of October, 1923.

WILLIAM STEINLE,
*Administrator of the estate of William J. Steinle, deceased.*